Patented June 20, 1950

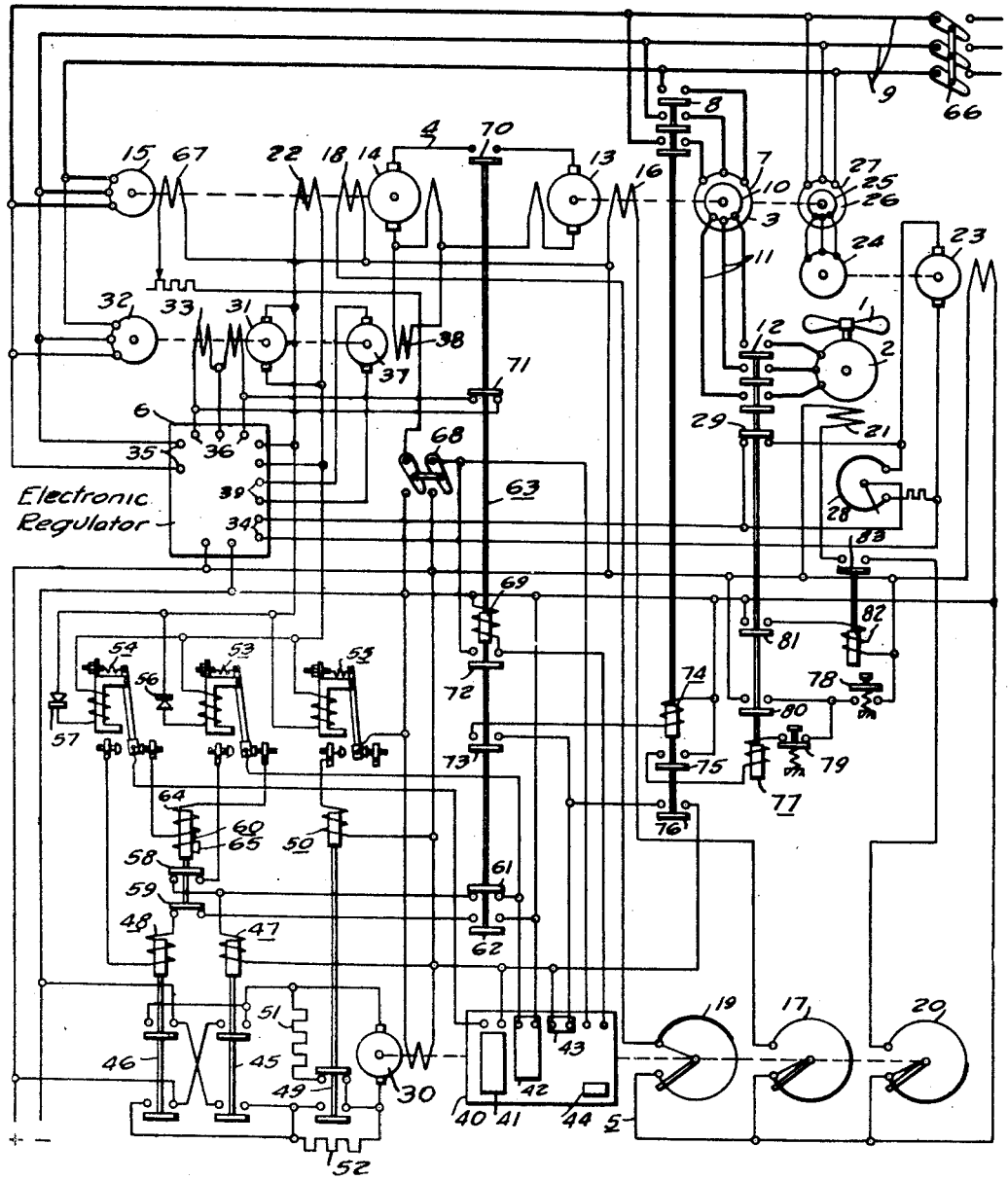

2,512,322

UNITED STATES PATENT OFFICE 2,512,322

WIDE SPEED RANGE CONTROL

Erling Frisch and William O. Osbon, Pittsburgh, Pa., assignors to Westinghouse Electric Corporation, East Pittsburgh, Pa., a corporation of Pennsylvania Application November 27, 1946, Serial No. 712,550

38 Claims. (Cl. 318—171)

This invention relates to a system of speed control for an alternating-current motor and, more particularly, to an arrangement by which the speed of an alternating-current motor may be varied over a wide range by varying the frequency of the alternating current supplied to such motor.

One of the principal objects of this invention is to provide a novel arrangement of control apparatus for varying the frequency of an alternating current being supplied to an alternating-current machine, and in which the frequency of the alternating current and thereby the speed of the alternating-current machine may be varied over a wide range by movement of a single speed control member.

Another object of the invention is to provide a control arrangement of the character referred to by which the motor being operated may be shut down without disturbing the position of the speed control member, and subsequently operated to automatically bring the speed to the value it had when it was shut down, or any other selected speed by a presetting operation of the speed control member.

Another object of the invention is to provide an improved arrangement of apparatus for varying the frequency of an alternating current.

A further object of the invention is to provide an improved control system for varying the frequency of an alternating current over a wide range which provides stable operation at all points in such range.

A still further object of the invention is to provide a control arrangement for a frequency converting system in which excessive corrections to the control apparatus by a speed regulating device is employed to effect major adjustments of the apparatus and thereby vary its speed of operation.

Other objects and advantages of this invention will become apparent from the following description and accompanying drawing in which the single figure diagrammatically illustrates a variable speed drive constructed in accordance with the principles of this invention.

Referring to the drawing, the apparatus shown is particularly designed for the operation of a wind tunnel drive. Such apparatus must be capable of providing extremely large amounts of power over a wide range of speed and of providing stable operation at all speeds. In this showing, the wind tunnel propeller is indicated by the numeral 1 and is illustrated as being driven by a synchronous motor 2. The synchronous motor 2 receives its power from a frequency converter 3 which is controlled by a motor and generator combination 4. Main control of the motor and generator combination 4, and thereby the operation of the frequency converter 3 and the speed of the tunnel motor 2, is effected by a motor operated rheostat indicated as a whole by the numeral 5. Secondary control is effected by an electronic regulator 6 and associated controls. This secondary regulation is employed to provide both a speed corrective regulation and a main regulation of the motor operated rheostat 5 in a manner to be described.

The frequency converter 3 is a wound rotor induction motor having its stator 7 connected by a switch 8 to a supply bus 9 providing a polyphase source of alternating current. The bus 9 carries the usual standard commercial supply at a constant frequency of 60 cycles. The rotor 10 of the frequency converter is connected by a circuit 11 under the control of contactors 12 to the synchronous motor 2. The stator 7 constitutes the primary, and the rotor 10 constitutes the secondary of the frequency converter 3. When the rotor 10 is rotating at the speed of the rotating field in the stator 7, the frequency of the current being supplied to the motor 2 will be zero. When the rotor 10 is stationary, the frequency converter 3 will act as a transformer and the 60-cycle frequency of the bus 9 will be supplied to the motor 2. For intermediate speeds of the rotor 10, a frequency proportionate to the speed of the rotor will be supplied by the frequency converter 3 and the motor 2 will operate at a corresponding speed.

To control the speed of rotation of the rotor 10, it is mechanically connected to the rotor 13 of a direct-current machine constituting part of the motor and generator combination 4. The rotor 13 is adapted to operate at variable speeds and is connected in series with the rotor 14 of a constant speed direct-current machine which is mechanically connected to synchronous motor 15. The variable speed machine 13 is provided with a field winding 16, which is connected to a direct-current bus through a variable rheostat 17. The constant speed machine 14 is provided with a field winding 18 which is similarly connected to the direct-current bus through a variable rheostat 19. A rheostat 20 similarly connects the direct-current winding 21 of the motor 2 to the direct-current bus. In connection with the rheostats 17, 19 and 20, the heavy segments indicate resistance elements and the light segments indicate slide contacts.

The rheostat 5 is shown in the position it will occupy when the tunnel motor is operated at minimum speed. In this position, all the resistance of the rheostat 19 is disconnected from the circuit of the winding 18 and the strength of the field provided by this winding will be at a maximum. In this position, the resistance of the rheostat 17 is connected into the circuit of the winding 16, and the strength of the field provided by this winding will be at a minimum. For this position, the rotor 13 will be rotating at its maximum speed, and the frequency of the alternating current supplied by the frequency converter 3 will be zero. To increase the frequency of the current being supplied to the motor 2, the rotor 10 must be slowed down, and this is accomplished by adjustment of the control fields 16 and 18 through operation of the rheostat 5. Upon rotation of the rheostat 5 from the position shown, the rheostat 17 will function to gradually increase the strength of the field 16 to a maximum, and after the field 16 reaches its maximum strength, the strength of the field provided by the winding 18 will be gradually reduced by the rheostat 19 to effect a further reduction in the speed of the machine 13 and rotor 10. As the speed of the rotor 10 is reduced, the frequency supplied to the motor 2 will be increased, and the speed of the motor 2 will be increased proportionately. As the speed of the motor 2 is increased, the rheostat 20 functions to increase the strength of the field provided by the motor winding 21, and thus increase the pull-out torque of the motor 2 for higher speeds of operation.

The constant speed machine 14 is provided with a secondary control field winding 22 which provides a corrective regulation for speed changes, and the strength of this field is controlled by the output of a pilot generator 23. The pilot generator 23 is a tachometer generator and is driven at a speed proportionate to the speed of the tunnel motor 2 and the frequency of the frequency converter 3. The pilot generator 23 is mechanically connected to an alternating-current motor 24 which is electrically connected to the rotor 25 of the frequency converter 26. The frequency converter 26 has its stator 27 connected to the alternating-current supply bus 9. The rotor 25 is mechanically connected to the rotor 10 and is driven at the same speed as the rotor 10. In order to provide a satisfactory quantity of speed intelligence at low speeds of operation of the motor 2, the frequency converter 26 is constructed with a fewer number of poles than is the frequency converter 3. It is the preferred practice to construct the frequency converter 3 with eight poles and the frequency converter 26 with six poles. In this manner, when the rotor 10 is rotating at a speed such that the output of the frequency converter 3 is zero, the output of the frequency converter 26 will be at a frequency of 15 cycles. By reason of this arrangement, the pilot generator 23 will produce a voltage sufficient to operate the control equipment at low speeds of operation of the tunnel motor 2. It will also be noted in view of the fact that the output of the frequency converter 3 operates over a range from about zero to about 60 cycles, and that the output of the frequency converter 26 operates over a range from about 15 cycles to about 60 cycles, that the overall speed range of the pilot generator 23 will be considerably less than the overall speed range of the motor 2. In this manner, the lower limit of the voltage produced by the pilot generator 23 will be considerably higher, and its upper limit will be considerably lower than would be the case if it were driven over a range of speed of the same value as the motor 2.

The output of the pilot generator 23 is controlled by an adjustable rheostat 28 and a contact 29 in a manner to be described. Its output is employed in conjunction with the electronic regulator 6 and a direct-current rotating regulator 31 to energize the secondary control field 22. The rotating regulator 31 is a direct-current generator which is driven at a constant speed by a synchronous motor 32, and the voltage and polarity of its output is under the control of a split field 33. The split field 33 is energized by the electronic regulator 6 in accordance with the speed intelligence fed thereto by the pilot generator 23. The electronic regulator 6 is merely a comparing device of a type well known in the art which compares two voltages and since its particular construction forms no part, per se, of this invention, it has not been illustrated in detail. In connection with the electronic regulator 6, it will be sufficient to point out that the variable voltage of the pilot generator 23 is fed thereto through the taps 34 and this voltage is compared with a constant rectified voltage originating from any alternating-current source at the taps 35. The difference between the two voltages is amplified and fed through the taps 36 to the split field 33. In normal operation, the two voltages will be balanced and there will be little or no energization of the field 33 and hence the output of the regulator 31 will be of a small value. In the event that the speed intelligence provided by the voltage from the pilot generator 23 varies, such variation will be noted in the comparing circuit within the electronic regulator 6, and the regulator will function to energize the split field 33 in the proper direction so that the output of the rotating regulator 31 will apply the appropriate correction to the secondary field 22.

In order to prevent excessive currents in the armature circuit of the motor-generator set 4, a current limiting rotating regulator 37 is provided. The rotating regulator 37 is a direct-current generator having a control field 38 energized in accordance with current changes in the set 4 and its output is fed into the electronic regulator 6 through the taps 39. When excessive currents flow in the armature circuit of the motor-generator set 4, the rotating regulator 37 will function to block the output of electronic regulator 6 to the split field 33 and thereby decrease the output of the regulator 31. The current limiting regulator 37 is designed to operate only for excessive currents in the armature cricuit of the motor-generator set 4, the remainder of the regulations being accomplished through the operation of the rotating regulator 31.

As pointed out above, the secondary winding 22 will, in normal operation, function to provide speed corrective regulations for any given speed of operation of the motor 2, and change in the operating speed of the motor 2 is accomplished through the main control windings 16 and 18 by variation of the resistance in the rheostats 17 and 19. The output of the rotating regulator 31, in addition to providing the speed corrective regulating intelligence for the winding 22, is also employed to effect operation of the motor operated rheostat 5 and recalibration of the control functions of the main control windings 16 and 18. This takes place when the regulation called for by the winding 22 is excessive. The regulation required by the winding 22 will be excessive whenever the output of the pilot generator 23 is varied by a change in the position of the rheostat 28 which is manually operable and is the main control rheostat. A change in the position of the rheostat 28 will result in variation of the voltage being fed to the taps 34, and the electronic regulator 6 will function to energize the split field winding 33 in a direction depending upon whether the change in voltage calls for an increase or decrease in speed of operation of the motor 2 and its pilot generator 23.

The above-mentioned changes in the setting of the rheostats 17 and 19 are accomplished automatically through operation of the motor operated rheostat 5 in a manner to be described. The rheostats 17, 19 and 20 have their movable contacts mounted on a common shaft which is driven by a direct-current motor 30. This shaft also carries a drum contactor 40 having slide contacts 41, 42, 43 and 44 mounted thereon. The contacts 43 and 44 are limit contacts which limit the movement of the rheostats being controlled in a manner to be described. The armature circuit of the motor 30 is adapted to be connected to the direct-current supply bus through reversing contactors 45 and 46. Operation of the contactor 45 is under the control of a relay 47 and energization of this relay to effect operation of the motor 30 will move the rheostat 5 from the position shown in a direction to raise the speed of the motor 2. Similarly, the contactor 46 is under the control of a relay 48, energization of which will effect operation of the motor 30 and rheostat 5 in a direction to lower the speed of the motor 2 and to return the rheostat 5 to the position shown in the drawing. The speed of operation of the motor 30 is under the control of a contactor 49 which is controlled by energization of a relay 50. In the illustrated position of the contactor 49, resistance 51 is connected in parallel with the motor 30 and resistance 52 is connected in series with motor 30, and such motor will be operated at slow speed when one of the contactors 45 or 46 is operated. When the relay 50 is energized, the contactor 49 will pick up from the position shown to cut the resistances 51 and 52 out of the armature circuit of the motor 30, and connect such motor directly across the direct-current bus for high-speed operation of the rheostat 5.

Energization of the relays 47, 48 and 50 are respectively under the control of relays 53, 54 and 55, which are substantially identical in construction and are adjustable as to the voltages at which they will cut in and drop out. The operating coils for the magnetic circuits of the relays 53, 54 and 55 are connected across the output circuit of the rotating regulator 31. The relays 53 and 54, which control energization of the relays 47 and 48, respectively, and thereby the direction of operation of the rheostat 5, are preferably adjusted so that such relays will pick up when the voltage in the operating coils of the relays 53 and 54 exceeds a value of about 20 volts and will drop out when such voltage is less than about 10 volts. Rectifier blocks 56 and 57 are provided in the operating circuits for the relays 53 and 54 so that only one of such relays will pick up at one time. In addition to the relays 53 and 54, the circuits for the coils 47 and 48 are under the control of contacts 58 and 59 which are operated by a time delay relay 60, contacts 61 and 62 which are operated by a control relay 63, and the slide contacts 41 and 42 on the drum contactor 40.

When the rheostat 5 is in either of its extreme positions corresponding to maximum or minimum speed of the motor 2, one of the limit contacts 41 or 42 will have operated to interrupt the circuit through the energizing coil 64 of the time delay relay 60, and the contacts 58 and 59 will have closed to permit energization of relay 47 or 48, according to the position of the rheostat 5. In between the extreme positions, the limit contacts 41 and 42 will operate to complete a circuit through the coil 64, and the relay 60 will operate to open the contacts 58 and 59. Subsequent operation of the relays 47 and 48 to operate the rheostat 5 will be then dependent upon operation of one of the relays 53 or 54. When the output of the rotating regulator 31 is increased to a value at which one of the relays 53 or 54 will operate, the relay operating will change the position of its movable contact carried by the armature thereof to interrupt the circuit through the coil 64. The time delay relay 60 is prevented from dropping out immediately by means of a holding coil 65 which will permit the relay 60 to drop out and close the contacts 58 and 59 after a suitable time interval. Upon closure of the contacts 58 and 59, one of the relays 47 or 48 will be operated to drive the motor 30 and rheostat 5 in a direction depending upon the relay 47 or 48 operated. If the output of the rotating regulator 31 is sufficiently large, then relay 55 and relay 50 operate to give an initial high-speed operation of the rheostat 5 in the direction determined by one of the relays 53 and 54. As this high speed change takes place, the speed of the motor 2 is varied to reduce the output of the regulator 31. After a suitable reduction in such output, the relay 55 will be deenergized, and the relay 50 will drop out to effect slow-speed operation of the motor 30. Thereafter, the rheostat will move at a slow speed and, in effect, creep into its final position in which the output of the regulator 31 will have been reduced sufficiently to permit the relay 53 and 54 which has been operated to drop out. The arrangement of the relay 50 and its control of the resistances 51 and 52 giving a fast and slow speed of the operating of the motor 30 effectively prevents hunting operation of the rheostat 5.

The operation of the apparatus is as follows:

The apparatus is started by closing of the switch 66 to energize the alternating-current bus 9, and this action places in operation the alternating-current motors 15 and 32. The motor 15 is a synchronous motor and is provided with the usual starting equipment (not shown) by which it is operated as an induction motor to about 90% of synchronous speed at which time its field 67 is energized to synchronize its operation. Although energization of the field 67 is actually automatic, it has been illustrated as being energized by a manually operable switch 68 for the purposes of this description. Closure of the switch 68 also ties in the remainder of the control equipment with the direct-current bus. In actual practice, the direct-current bus will be energized from a motor-generator set (not shown) which will be started automatically by closure of the switch 66.

With the rheostat 5 in the position shown, a circuit will be completed through the limit switch contactor 42, contact 61, and relay 47 to operate the contactor 45, and thus operate to move the rheostat 5 from the position shown to its other extreme position corresponding to maximum speed position for the motor 2. As the rheostat 5 moves into its other extreme position, limit switch 44 will operate to complete a circuit through the operating coil 69 which will pick up the relay 63. The rheostat 5 is now in the position corresponding to maximum speed of the motor 2, and in this position, the strength of the field winding 18 is at a minimum, and contact 70 may be closed by operation of the relay 63 without causing excessive currents to flow in the armature circuit of the motor-generator set 4. Operation of the relay 63 opens contact 71 to render the split field 33 operative, closes contact 72 to provide a holding circuit for the coil 69, closes contact 73 to set up a circuit for subsequent operation of relay 74 for a purpose to be described, and opens contact 61 and closes contact 62.

At the time relay 63 operates, the variable speed machine 13 will be at rest, the output of the frequency converter 3 will be at zero frequency due to the contacts 8 being open, the output of the frequency converter 26 will be at the maximum frequency on the line, and the output of the generator 23 will be a maximum. At this time, full output of the generator 23 will be applied to the electronic regulator 6 due to the contact 29 shorting the control rheostat 28 out of the pilot generator circuit. With maximum voltage being fed into the taps 34 of the electronic regulator 6, the output of the rotating regulator 31 will be a maximum, and relays 55 and 53 will operate to return the rheostat 5 to the position illustrated in the drawing, corresponding to minimum speed position of the tunnel motor 2. As the rheostat 5 is thus moved, the strength of field 18 will be gradually increased and the strength of field 16 thereafter gradually decreased, and the machine 13 will operate as a motor to bring the rotor 10 of the frequency converter 3 to full speed. When the rotor 10 reaches full speed, the relay 74 will operate to close the contacts 8 and connect the frequency converter 3 to the bus 9. This is accomplished when the rheostat returns to the position shown in the drawing, in which position, the limit switch contact 43 operates to complete a circuit through the contact 73 previously mentioned and operating coil of the relay 74. The relay 74 will then function to close the contacts 8 and connect the frequency converter 3 to the bus 9. At the same time, contacts 75 and 76 are operated by relay 74 to their closed position. Closure of contact 75 sets up a circuit by which relay 77 may be operated upon closure of the manually operable start button 78. Closure of contact 76 provides a holding circuit for the relay 74 upon subsequent movement of the limit contact 43 out of the position shown.

The apparatus is now in condition for closure of the contacts 12 to connect the synchronous motor 2 to the frequency converter 3 since it will be recalled that the rheostat 5 is in a position corresponding to minimum speed of the tunnel motor 2, and the rotor 10 is rotating at maximum speed with zero frequency being supplied to the line 11 by the frequency converter 3. Due to this arrangement by which the tunnel motor 2 is connected to the frequency converter 3 at a time when the output of such converter is zero, it will be seen that the field 21 may be energized without danger of the motor 2 drawing excessively heavy currents to synchronize its operation. This feature is considered very important in view of the tremendous power required by tunnel installations for airplane testing purposes.

Closure of the start button 78 completes a circuit through the stop button 79, the operating coil for the relay 77, and contact 75 of relay 74. Relay 77 then picks up and moves contact 80 to its closed position providing a holding circuit for the operating coil of the relay 77, closes contact 81 to energize coil 82 and thereby close contact 83 to energize the direct-current field 21 for the tunnel motor 2, opens contact 29 to connect the manually adjustable speed control rheostat 28 across the output circuit of the pilot generator 23, and closes contacts 12 to connect the tunnel motor 2 to the output circuit 11 of the frequency converter 3. If at the time start button 78 is operated the manually operable rheostat 28 is in a position corresponding to the minimum speed position of the tunnel motor, the operation of the tunnel motor will not change nor will the setting of the motor operated rheostat 5. If at the time the start button 78 is operated the manually operable rheostat 28 is in any position between its minimum speed position and its full-speed position, the apparatus will function automatically to increase the speed of the tunnel motor 2 to the speed called for by the preset position of the manually adjustable rheostat 28. Subsequent changes in speed of operation of the tunnel motor 2 will be had by adjustment of the rheostat 28 to vary the output of the pilot generator 23. Upon such movement of the manually operable rheostat 28, the apparatus functions to automatically position the motor operated rheostat 5 corresponding to the speed called for by the setting of the rheostat 28, and thereafter automatically regulates the speed through the secondary control field winding 22 to maintain such speed.

From the foregoing, it will be seen that the control arrangement illustrated in the drawing and described above provides a speed control system by which the frequency of an alternating current may be varied over a wide range and by which the speed of an alternating-current motor may be varied over a wide range. It will also be noted that the variation in frequency or the speed of motor operation is accomplished through adjustment of a single manually operable member. It will be noted additionally by reason of this arrangement that the apparatus may be shut down with the motor operating at any speed and subsequently started to return the speed of the motor automatically to the speed at which it was shut down. In the same manner, it is possible to preset the position of the rheostat 28 and the apparatus will function automatically to start the equipment and bring the speed of the motor automatically to the preset value. The manner in which the circuit of the secondary speed corrective regulating field 22 is employed to automatically recalibrate the control provided by the fields 16 and 18 through automatic operation of the motor operated rheostat 5 is believed to be very important to the operation of this apparatus and to the accomplishment of the features and advantages set forth above.

Since numerous changes may be made in the above-described construction and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. A speed control system for an alternating current motor comprising a source of alternating current, a frequency converter connected to said source and said motor and having relatively rotatable stator and rotor windings, and a control arrangement for varying the relative speed of rotation of said windings to vary the frequency supplied to said motor and thereby its speed of operation comprising a direct current motor-generator set for controlling the relative speed of rotation of said windings, field excitation means for said motor generator set, a motor operated rheostat for adjusting said field excitation means, auxiliary field control means for said motor-generator set including a rotating direct current machine for energizing the same, a tachometer-generator set connected to said converter, a regulator in the output circuit of said tachometer-generator set for controlling the operation of said rotating direct current machine to effect speed corrective regulation of said converter, a speed control rheostat for varying the output of said tachometer-generator set, and means responsive to the output of said rotating machine upon operation of said speed control rheostat for operating said motor operated rheostat to change the speed of said converter.

2. A system as claimed in claim 1 wherein said last named means comprises a pair of reversing contactors for said motor operated rheostat and relay means for operating the same.

3. A system as claimed in claim 1 wherein said last named means comprises a pair of reversing contactors for said motor operated rheostat and relay means for operating the same, together with voltage responsive means in the output circuit of said rotating machine for effecting energization of said relay means.

4. A speed control system for a synchronous motor comprising a source of alternating current, a frequency converter comprising a wound rotor induction machine having its primary connected to said source and its secondary connected to the synchronous motor, a control arrangement for varying the rotor speed of said converter to vary the frequency supplied to said synchronous motor and thereby its speed comprising a direct current motor-generator set connected to the rotor of said frequency converter, field excitation means for said motor generator set, a motor operated rheostat for adjusting said field excitation means, auxiliary field control means for said motor generator set including a rotating direct current machine for energizing the same, a tachometer-generator set comprising a frequency converter having a rotating member operatively connected to the rotor of said induction machine for rotation therewith and an output circuit, and a motor in said output circuit having a pilot generator operated thereby to provide an output responsive to the speed of said induction machine, said different converters having a different number of poles whereby the output of said tachometer-generator set will be considerable when said synchronous motor is rotating at low speeds, a regulator in the output circuit of said pilot generator set for controlling the operation of said rotating direct current machine to effect speed corrective regulation of said first frequency converter, a speed control rheostat for varying the output of said pilot generator, and means responsive to the output of said rotating machine upon operation of said speed control rheostat for operating said motor operated rheostat to change the speed of said converter.

5. A speed control system for an alternating current motor comprising a first frequency converting means for operating said motor at varying speeds, adjustable control means for regulating the operation of said frequency converting means, means responsive to the speed of said motor for effecting speed corrective regulation of said converting means, the last said means comprising a second frequency converting means having a lesser number of poles than said first frequency converting means, and means responsive to predetermined conditions of said last named means for effecting operation of said control means to vary the speed of said motor.

6. A speed control system for an alternating current motor comprising a first frequency converting means for operating said motor at varying speeds, adjustable control means for regulating the operation of said frequency converting means, means responsive to the speed of said motor for effecting speed corrective regulation of said converting means, the last said means comprising a second frequency converting means having a lesser number of poles than said first frequency converting means, manually operable means for adjusting said last named means, and means operative upon operation of said manually operable means for effecting operation of said control means to vary the speed of said motor.

7. In a system for providing an alternating current at variable frequencies, a frequency converting unit, adjustable control means for regulating the operation of said unit, means responsive to the operation of said unit for effecting corrective regulation of the operation of said unit, and means responsive to predetermined operating conditions of said last named means for effecting operation of said adjustable control means to regulate the operation of said unit.

8. In a system for providing an alternating current at variable frequencies, a frequency converting unit, adjustable control means for regulating the operation of said unit, means responsive to the operation of said unit for effecting corrective regulation of the operation of said unit, manual means for adjusting said last named means, and means operative upon operation of said manual means for effecting operation of said adjustable control means to regulate operation of said unit.

9. A speed control system for an alternating current motor comprising a frequency converting unit for operating the motor at varying speeds, an auxiliary machine for controlling the operation of said frequency converting unit, a speed responsive machine for effecting corrective speed regulation of said auxiliary machine, a motor operated rheostat for controlling operation of one of said machines, a manually operated rheostat for controlling the operation of the other of said machines, and means operative in response to operation of said manually operated rheostat for operating said motor operated rheostat to thereby vary the operation of both of said machines and effect a speed change of said motor.

10. A speed control system for an alternating current motor comprising a frequency converting unit for operating the motor at varying speeds, an auxiliary machine for controlling the operation of said frequency converting unit, having a main control field and an auxiliary control field for controlling the operation of said auxiliary machine to vary the speed of said motor, means responsive to the speed of said motor for controlling the operation of said auxiliary machine to provide corrective speed regulation of the motor, the last said means having associated therewith separate controls for each of said fields, and means responsive to the operation of one of said controls for automatically effecting operation of the other said controls.

11. A speed control system for an alternating current motor comprising a frequency converting unit for operating the motor at varying speeds, a direct current machine for controlling the operation of said frequency converting unit, having a main control field and an auxiliary control field for controlling operation of said machine to vary the speed of said motor, means responsive to the speed of said motor for controlling the operation of said machine to effect corrective speed regulation of said motor, the last said means having associated therewith a manually adjustable rheostat for one of said fields, a motor operated rheostat for the other of said fields, and means responsive to operation of said manually adjustable rheostat for effecting automatically adjustment of said motor operated rheostat.

12. A speed control system for an alternating current motor comprising a source of alternating current, a frequency converter connected to said source and said motor and having relatively rotatable stator and rotor windings, and a control arrangement for varying the relative speed of rotation of said windings to vary the frequency supplied to said motor and thereby its speed of operation comprising a direct-current machine connected to said frequency converter for controlling the relative speed of rotation of its windings, said machine having a main control field and an auxiliary control field for effecting variable speed regulation of said converter, means responsive to the speed of said motor for for effecting said auxiliary control field for corrective speed regulation of said converter, the last said means having associated therewith a manually operable rheostat for controlling one of said fields, a motor operated rheostat for controlling the other of said fields, and means responsive to operation of said manually operable rheostat for automatically adjusting the position of said motor operated rheostat.

13. A control system for an alternating-current motor comprising a frequency converting unit for operating the motor at varying speeds, an auxiliary machine for controlling operation of said frequency converting unit, an adjustable main control for said auxiliary machine, a second control including means responsive to the changing speed of said motor for altering the control regulation of said main control, and means responsive to predetermined conditions of said second control for effecting adjustment of said main control.

14. A control system for an alternating-current motor comprising a frequency converting unit for operating the motor at varying speeds, an auxiliary machine for controlling operation of said frequency converting unit, a main control for adjusting the operation of said auxiliary machine to effect operation of said motor over a predetermined range, a second control including a pilot generator responsive to the speed of said motor but operable over a range less than the range of said motor for altering the control regulation of said main control, and means responsive to predetermined conditions of operation of said second control for effecting direct regulation of said main control.

15. A control system for an alternating-current motor comprising a frequency converting unit for operating the motor at varying speeds, an auxiliary machine for controlling operation of said frequency converting unit, a main control for adjusting the operation of said auxiliary machine to effect operation of said motor over a predetermined range, a second control for said auxiliary machine including a second frequency converter driven at the same speed as said first frequency converter, said second frequency converter having fewer poles than said first frequency converter whereby it will have a predetermined minimum output frequency when the output of said first converter is at a low frequency, and a motor connected to the output of said second converter and having a pilot generator driven thereby, said pilot generator being operative through said second control to effect corrective speed regulations of said motor, and means responsive to predetermined conditions of the output of said pilot generator for effecting direct regulation of said main control.

16. A control system for an alternating current motor comprising a frequency converting unit for operating the motor at varying speeds, an auxiliary machine for controlling operation of said frequency converting unit, a main control for adjusting the operation of said auxiliary machine to effect operation of said motor over a predetermined range, a second control including a pilot generator responsive to the speed of said motor but operable over a range less than the range of said motor for altering the control regulation of said main control, a motor operated rheostat for regulating said main control, a manually operated rheostat for varying the output of said pilot generator, and means responsive to changes in the output of said pilot generator upon operation of said manually operated rheostat for effecting operation of said motor operated rheostat to vary the speed of said motor.

17. A control system for an alternating current motor comprising a frequency converting unit for operating the motor at varying speeds, an auxiliary machine for controlling operation of said frequency converting unit, a main control for adjusting the operation of said auxiliary machine to effect operation of said motor over a predetermined range, a second control including a pilot generator responsive to the speed of said motor but operable over a range less than the range of said motor for altering the control regulation of said main control, a motor operated rheostat for regulating said main control, a manually operated rheostat for varying the output of said pilot generator, and means responsive to changes in the output of pilot generator upon operation of said manually operated rheostat for effecting operation of said motor operated rheostat to vary the speed of said motor.

18. A control system for an alternating current motor comprising a frequency converting unit for operating the motor at varying speeds, an auxiliary machine for controlling operation of said frequency converting unit, a main control for adjusting the operation of said auxiliary machine to effect operation of said motor over a predetermined range, a second control for said auxiliary machine including a second frequency converter driven at the same speed as said first frequency converter, said second frequency converter having fewer poles than said first frequency converter whereby it will have a predetermined minimum output frequency when the output of said first converter is at a low frequency, and a motor connected to the output of said second converter and having a pilot generator driven thereby, said pilot generator being operative through said second control to effect corrective speed regulations of said motor, a manually operable rheostat for adjusting one of said controls, a motor operated rheostat for adjusting the other of said controls, and means responsive to operation of said manually operable rheostat for effecting operation of said motor operated rheostat.

19. A control system for an alternating current motor comprising a frequency converting unit for operating the motor at varying speeds, an auxiliary machine for controlling operation of said frequency converting unit, a main control for adjusting the operation of said auxiliary machine to effect operation of said motor over a predetermined range, a second control for said auxiliary machine including a second frequency converter driven at the same speed as said first frequency converter, said second frequency converter having fewer poles than said first frequency converter whereby it will have a predetermined minimum output frequency when the output of said first converter is at a low frequency, and a motor connected to the output of said second converter and having a pilot generator driven thereby, said pilot generator being operative through said second control to effect corrective speed regulations of said motor, a motor operated rheostat for regulating said main control, a manually operable rheostat for varying the output of said pilot generator, and means responsive to changes in the output of said pilot generator upon operation of said manually operable rheostat for effecting operation of said motor operated rheostat to vary the speed of said motor.

20. A control system for an alternating current motor comprising a frequency converting unit for operating the motor at varying speeds, an auxiliary machine for controlling the operation of said frequency converting unit, a main control for said auxiliary machine, a second control including means responsive to changing speed of said motor for altering the control regulation of said main control, and a relay operable in response to operation of one of said controls for effecting operation of the other of said controls.

21. A control system for an alternating current motor comprising a frequency converting unit for operating the motor at varying speeds, an auxiliary machine for controlling the operation of said frequency converting unit, a main control for said auxiliary machine, a second control including means responsive to changing speed of said motor for altering the control regulation of said main control, a manually operable rheostat for operating one of said controls, a motor operated rheostat for operating the other of said controls, and a relay responsive to operation of said one control upon operation of said manually operable rheostat for effecting operation of said motor operated rheostat.

22. A control system for an alternating current motor comprising a frequency converting unit for operating the motor at varying speeds, a direct current machine for controlling operation of said frequency converting unit, a main control field for said machine, a motor operated rheostat for varying the strength of said field to thereby vary the speed of said motor, a second control field means responsive to the speed of said motor for providing a speed corrective regulation of said main control field, a manually operable rheostat for adjusting said second control field means, and a relay responsive to changing conditions in said second field means upon operation of said manually operable rheostat for effecting operation of said motor operated rheostat to vary the speed of said motor.

23. A control system for an alternating current motor comprising a frequency converting unit for operating the motor at varying speeds, a direct current machine for controlling operation of said frequency converting unit, a main control field for said machine, a motor operated rheostat for varying the strength of said field to thereby vary the speed of said motor, a second control field means having a pilot generator responsive to the speed of said motor for energizing the same, a manually operable rheostat for varying the output of said pilot generator, and a pair of relays respectively operable to effect operation of said motor operated rheostat in opposite directions, one of said relays being responsive to a change in the output of said pilot generator in one direction to effect operation of said motor operated rheostat in a direction to increase the speed of said motor, the other of said relays being responsive to a change in the output of said pilot generator in an opposite direction to effect operation of said motor operated rheostat in its other direction to decrease the speed of said motor.

24. A system as claimed in claim 23 wherein the motor operated rheostat is provided with limit contacts in the circuits of each of said relays for deenergizing said relays at the extreme limits of rheostat travel.

25. In a variable speed control system, the combination of an alternating current motor, a frequency converting unit, means for operating said unit to vary the frequency of its output, a circuit for connecting the output of said unit to said motor, a single control member for regulating said operating means and movable to different control positions corresponding to different motor speeds, means controlling the connection of said circuit to said motor, and means for rendering said control member inoperative to regulate said operating means prior to the connection of said motor to said circuit.

26. In a variable speed control system, the combination of an alternating current motor, a frequency converting unit, means for operating said unit to vary the frequency of its output, a circuit for connecting the output of said unit to said motor, a single control member for regulating said operating means and movable to different control positions corresponding to different motor speeds, means controlling the connection of said circuit to said motor, and means for rendering said control member inoperative to regulate said operating means prior to the connection of said motor to said circuit, said operating means being effective to reduce the frequency output of said unit to a minimum prior to operation of said last named means to render said control member operative.

27. In a system for providing an alternating current at variable frequencies, a frequency converting unit, a motor operated rheostat for effecting a main control of the operation of said unit, means for effecting a corrective regulation of the operation of said unit including a tachometer generator driven at a speed varying with the operation of said unit, and a relay responsive to predetermined conditions in said last named means for effecting an operation of said motor operated rheostat.

28. In a system for providing an alternating current at variable frequencies, a frequency converting unit, a first control for effecting a main control of the operation of said unit, a second control responsive to variations in the operation of said unit for effecting a corrective regulation of the operation of said unit, the corrective regulation of said second control being normally operative between predetermined limits, and means responsive to a corrective regulation of said second control beyond said predetermined limits for operating said first control to regulate the operation of said unit.

29. In a system for providing an alternating current at variable frequencies, a frequency converting unit, a first control for effecting a main control of the operation of said unit, a second control responsive to variations in the operation of said unit for effecting a corrective regulation of the operation of said unit, the corrective regulation of said second control being normally operative between predetermined limits, a manual adjustment for varying the corrective regulation of said second control so that the corrective regulation provided thereby is beyond said predetermined limits, and means responsive to a corrective regulation of said second control in excess of said predetermined limits for operating said first control to change the operation of said unit so that the corrective regulation required of said second control will again fall within said predetermined limits.

30. In a system for providing an alternating current at variable frequencies, a frequency converting unit comprising an induction machine having a primary winding for connection to a source of alternating current at a substantially constant frequency and a secondary winding, a direct current machine controlling rotation of said windings relative to each other and thereby the frequency of the alternating current induced in said secondary winding, main field excitation means for said direct current machine, secondary field excitation means for said direct current machine, said secondary field excitation means including means responsive to variations in the frequency in said secondary winding for regulating its exciting effect on said direct current machine to maintain the frequency in said secondary winding at a value called for by said main field excitation means, and means responsive to a regulation by said secondary excitation means in excess of a predetermined amount for affecting an adjustment of said main excitation means.

31. In a system for providing an alternating current at variable frequencies, a frequency converting unit comprising an induction machine having a primary winding for connection to a source of alternating current at a substantially constant frequency and a secondary winding, a direct current machine controlling rotation of said windings relative to each other and thereby the frequency of the alternating current induced in said secondary winding, a main control field for said direct current machine, excitation means for said main control field including a motor operated rheostat, a secondary control field for said direct current machine, excitation means for said secondary control field including means responsive to the frequency of the induced current in said secondary winding for varying the excitation strength of said secondary control field to provide a corrective regulating effect on said direct current machine for maintaining the frequency of current in said secondary winding at a value called for by the setting of said motor operated rheostat, and a relay responsive to a regulating action of said secondary control field in excess of a predetermined amount for changing the setting of said motor operated rheostat.

32. In a system for providing an alternating current at variable frequencies, a frequency converting unit comprising an induction machine having a primary winding for connection to a source of alternating current at a substantially constant frequency and a secondary winding, a direct current machine controlling rotation of said windings relative to each other and thereby the frequency of the alternating current induced in said secondary winding, a main control field for said direct current machine, excitation means for said main control field including a motor operated rheostat, a secondary control field for said direct current machine, excitation means for said secondary control field including means responsive to the frequency of the induced current in said secondary winding for varying the excitation strength of said secondary control field to provide a corrective regulating effect on said direct current machine for maintaining the frequency of current in said secondary winding at a value called for by the setting of said motor operated rheostat, a manually operable rheostat for adjusting the operation of said frequency responsive means, and a relay responsive to operation of said manually operable rheostat for changing the setting of said motor operated rheostat.

33. In a system for providing an alternating current at variable frequencies, a frequency converting unit comprising an induction machine having a primary winding for connection to a source of alternating current at a substantially constant frequency and a secondary winding, a direct current machine controlling rotation of said windings relative to each other and thereby the frequency of the alternating current induced in said secondary winding, a main control field for said direct current machine, excitation means for said main control field including a motor operated rheostat, a secondary control field for said direct current machine, a tachometer generator driven at a speed varying with the frequency of induced current in said secondary winding for exciting said secondary control field, a manually operable rheostat for adjusting the output of said tachometer generator, and a relay responsive to operation of said manually operable rheostat for changing the setting of said motor operated rheostat.

34. In a system for providing an alternating current at variable frequencies, a frequency converter having a rotatable element movable at variable speeds for varying the frequency output of the unit, a main control for varying the speed of said rotatable element, a second control for varying the speed of said rotatable element including a second frequency converter having a rotatable element driven at the same speed as the speed of the rotatable element in said first frequency converter, said second converter having fewer poles than said first converter whereby it will have a predetermined minimum output frequency when the output of said first converter is at a low frequency, and a motor connected to the output of said second converter and having a pilot generator driven thereby, said pilot generator being operative through said second control for varying the speed of said rotatable elements, and means responsive to predetermined conditions of the output of said pilot generator for effecting direct regulation of said main control.

35. In a system for providing an alternating current at variable frequencies, a frequency converting unit having a variable frequency output, a direct current machine for controlling the operation of said frequency converting unit, a main control field for said machine, a motor operated rheostat for varying the strength of said field to thereby vary the frequency output of said unit, a second control field having a pilot generator responsive to the frequency output of said unit for energizing said second field, a manually operable rheostat for varying the output of said generator, and a pair of relays respectively operable to effect operation of said motor operated rheostat in opposite directions, one of said relays being responsive to a change in the output of said generator in one direction to effect operation of said motor operated rheostat in a direction to increase the frequency output of said unit, the other of said relays being responsive to a change in the output of said generator in an opposite direction to effect operation of said motor operated rheostat in its other direction to decrease the frequency output of said unit.

36. In a variable speed control system, the combination of an alternating current motor, a frequency converting unit, adjustable control mechanism for varying the frequency output of said unit, a switch for connecting the output of said unit to said motor, means operable while said switch is open for operating said control mechanism to reduce the frequency output of said unit to a predetermined minimum value, and a relay operative in response to the reduction of the frequency output of said unit to said predetermined value for closing said switch to connect said motor to said converting unit.

37. In a variable speed control system, the combination of a synchronous motor having a direct current winding, a source of potential for energizing said winding, a switch for connecting said source with said winding, a frequency converting unit, adjustable control mechanism for varying the frequency output of said unit, a switch for connecting the output of said unit to said motor, means operable while said switches are open for operating said control mechanism to reduce the frequency output of said unit to a predetermined minimum value, and relay mechanism for closing said switches in response to output of said converting unit being reduced to said predetermined minimum value.

38. In a variable speed control system, the combination of an alternating current motor, a frequency converting unit, adjustable control mechanism for varying the frequency output of said unit, a switch for connecting the output of said unit to said motor, a single control member movable to different positions for operating said control mechanism to provide different speeds of said motor corresponding to the positions of said control member, means operable while said switch is open for operating said control mechanism independently of the position of said control member to reduce the frequency output of said unit to a predetermined minimum value, a relay for closing said switch in response to the output of said converting unit being reduced to a predetermined minimum value, and means responsive to operation of said relay for rendering said control member operative.

ERLING FRISCH.
WILLIAM O. OSBON.

REFERENCES CITED

The following references are of record in the file of this patent:

UNITED STATES PATENTS

| Number | Name | Date |
| --- | --- | --- |
| 2,335,874 | Moyer et al. | Dec. 7, 1943 |
| 2,431,252 | Hornbarger | Nov. 18, 1947 |